United States Patent
Sperling et al.

(10) Patent No.: US 6,548,455 B1
(45) Date of Patent: Apr. 15, 2003

(54) CHAIN LUBRICANT FOR CONVEYOR AND TRANSPORT SYSTEMS

(75) Inventors: Michael Sperling, Zweibruecken (DE); Guenter Stroh, Mannheim (DE); Heinrich Hix, Reith (AT); Juergen Gutknecht, Alzey (DE)

(73) Assignee: Bactria Industriehygiene-Service GmbH & Co. KG, Kirchheimbolanden (DE)

( * ) Notice: Subject to any disclaimer, the term of this patent is extended or adjusted under 35 U.S.C. 154(b) by 0 days.

(21) Appl. No.: 09/807,465

(22) PCT Filed: Oct. 8, 1999

(86) PCT No.: PCT/EP99/07550
§ 371 (c)(1),
(2), (4) Date: Jun. 26, 2001

(87) PCT Pub. No.: WO00/22072
PCT Pub. Date: Apr. 20, 2000

(30) Foreign Application Priority Data

Oct. 13, 1998 (DE) .......... 198 46 991

(51) Int. Cl.⁷ .............. C10M 173/02; C10M 125/18
(52) U.S. Cl. .............. 508/175; 508/154; 508/390; 508/429; 508/431; 508/501; 508/517
(58) Field of Search .............. 508/517, 390, 508/431, 175

(56) References Cited

U.S. PATENT DOCUMENTS

| | | | | |
|---|---|---|---|---|
| 4,104,190 A | * | 8/1978 | Hartshorn | 252/187 R |
| 4,384,965 A | * | 5/1983 | Hellsten et al. | 252/32.5 |
| 4,521,321 A | * | 6/1985 | Anderson et al. | 252/49.3 |
| 4,839,067 A | | 6/1989 | Jansen | 252/11 |
| 5,009,801 A | * | 4/1991 | Wider et al. | 252/33.2 |
| 5,062,979 A | | 11/1991 | Scharf et al. | 252/49.3 |
| 5,068,422 A | * | 11/1991 | Balzer et al. | 562/587 |
| 5,223,162 A | * | 6/1993 | Rossio | 252/33.2 |
| 5,279,677 A | * | 1/1994 | Das | 134/3 |
| 5,282,987 A | * | 2/1994 | Balzer et al. | 252/34 |
| 5,391,308 A | * | 2/1995 | Despo | 252/32.5 |
| 5,651,996 A | * | 7/1997 | Roozdar | 424/665 |
| 5,744,432 A | * | 4/1998 | Barnhorst et al. | 508/431 |
| 5,935,914 A | * | 8/1999 | Theyssen et al. | 508/517 |
| 6,040,280 A | * | 3/2000 | Kelly et al. | 508/503 |
| 6,207,622 B1 | * | 3/2001 | Li et al. | 508/208 |
| 6,214,777 B1 | * | 4/2001 | Li et al. | 508/388 |

FOREIGN PATENT DOCUMENTS

| | | |
|---|---|---|
| DE | 36 31 953 | 3/1988 |
| DE | 38 31 448 | 3/1990 |
| DE | 39 05 548 | 9/1990 |
| DE | 196 42 598 | 4/1998 |
| DE | 199 42 535 A1 * | 3/2001 |
| EP | 0 044 458 | 1/1982 |
| EP | 0 359 145 | 3/1990 |
| JP | 60-101195 | 6/1985 |
| WO | 95/33808 | 12/1995 |
| WO | 96/02616 | 2/1996 |

OTHER PUBLICATIONS

"Ullmanns Encyklopädie der Technishchne Chemie: 4., neubearbeitete und erweiterte Auflage", Dentalchemie Bis Erdölverarbeitung, Verlag Chemie, Weinhaeim/Bergstr., vol. 10, p. 45 (1975).

"Römpp Chemie Lexikon: 9., erweiterte und neubearabeitete Auflage", by Dr. Jürgen Falbe et al., Georg Thieme Verlag Stuttgart, New York, p. 711 (1995).

* cited by examiner

*Primary Examiner*—Ellen M. McAvoy
(74) *Attorney, Agent, or Firm*—Foley & Lardner

(57) ABSTRACT

The invention relates to a chain lubricant for conveyor and transport systems which is comprised of water, surfactants, disinfecting agents as well as conventional auxiliary agents and additives. According to the invention, an anionic surfactant is used as the surfactant and chlorine dioxide is used as the disinfecting agent.

7 Claims, No Drawings

CHAIN LUBRICANT FOR CONVEYOR AND TRANSPORT SYSTEMS

The present invention concerns chain lubricants for conveyer and transport systems, especially in the foodstuff industry, which are suitable for lubrication, cleaning and disinfection of the transport chains. Furthermore, the invention concerns the process for the use of this chain lubricant.

The invention preferably concerns the lubrication of conveyoer and transport chains in filling plant for foodstuffs, preferably of drinks which are filled into glass or synthetic material bottles, tins or other drink containers.

In the filling operation, the above containers are transported during the filling to various stations, for example cleaning stations, filling stations, labelling stations, packing stations. This usually takes place by means of conveying and transport plant which usually, for reasons of hygiene and corrosion protection, consist of stainless steel but the transport chain can also be of synthetic material. Such plant are, in the following, designated as conveying plant.

In order to reduce mechanical stressing of containers and transport plant, a sufficient lubrication of the transport bands is necessary in order that the band can be further moved unhindered even when the containers on the band can sometimes not be moved forwards.

If the conveying plant are not lubricated to a sufficient extent, this can, on the one hand, have the result that the containers fall over or, on the other hand, that they do not stop although the corresponding filling, cleaning or labelling station is reached. Both kinds of disturbances can lead to comparatively long stationary times of the conveying plant and thus to considerable decreases of capacity. On the other hand, the lubrication is not to be so strong that the containers, already in the case of small counterforces, are no longer taken along by the transport band, i.e. especially in the case of transfer from one conveyor band to the other, in the case of ascending or descending bands or in the case of insertion into the working stations are not sufficiently conveyed.

Besides the lubricating action, in the case of conveying plant in the foodstuff industry, there is necessary especially also a cleaning and disinfecting, especially biostatic action of the chain lubricant.

The chain lubricants at present used can be essentially divided into 3 main groups:

1. lubricants based on soap,
2. lubricants based on fatty amines and
3. lubricants based on synthetic tensides.

The originally used lubrication based on soaps was usable relatively without problems and gave a good lubrication and cleaning but had the disadvantage that the soap components represent a good nutrient medium for micro-organisms and, on the other hand, soaps are sensitive towards hard water so that complexing agents, for example ethylenediaminetetrascetic acid (EDTA) must additionally be added. Furthermore, EDTA can, in addition, only be broken down with difficulty in the clarification system.

For these reasons, today there are used especially lubricant concentrates based on fatty amines, as well as amphoteric tensides (e.g. alkylaminoalkylcarboxylic acids (cf. DE 36 31 953-A1 and WO 95/33808-A1). Since these amino compounds themselves display only a small biocidal and cleaning action, in DE 36 31 953-A1 it is recommended additionally to clean and disinfect at regular intervals the plant with an acidic cleaning fluid which requires a considerable expense.

Furthermore, from WO 96/02616-A1 are known chain lubricants which consist of alkylpolyglycol phosphoric acid esters to which are additionally added aromatic biocides or quaternary ammonium compounds.

From EP 0 044 458-A1 and DE 196 42 598-A1 are known chain lubricants based on alkylpolyglycol-carboxylic acids which, alone or in admixture with other tensides, display a good lubricating and purifying action, in comparatively high concentration these products even appear to display a certain biocidal action although it is stated in DE 196 42 598-A1 that the products can be broken down not only aerobically but also anaerobically in clarification plant.

Furthermore, from EP 0 359 145-A1 are known soap-free lubricant compositions which contain alkylbenzenesulphonates, alkoxylated alkanol phosphates and alkanecarboxylic acids, as well as usual adjuvants and to which, as disinfecting agents, are added glutaraldehyde, isothiazoline, oxy compounds or pyridinethiol oxide in 5–50% of the tensides.

The use of quaternary ammonium compounds as disinfecting agents in cleaning agents with which normally conveyor systems lubricated with fatty amines are from time to time cleaned is described in DE 36 31 953-A1. On the other hand, in DE 39 05 548-A1 it is attempted, by use of secondary and/or tertiary amines, to use lubricants which show their own biocidal action. Although these products are to show their own cleaning action, it is, nevertheless, recommended to carry out an additional cleaning from time to time with organic or inorganic acids.

It is common to all of the above proposals that, insofar as a biocidal component is contained in the mixture this finally gets into waste water and, especially when they occur in comparatively high concentrations, can disturb the aerobic and anaerobic biological stages in clarification plant.

Therefore, the task arises to develop chain lubricants which are not based on cationic or amphoteric tensides. The biocidal components of the chain lubricants must be those which safely and quickly kill of germs damaging the filling materials but, on the other hand, can readily be broken down biologically and must not negatively influence clarification plant and the environment. The solution was, surprisingly, found in the use of anionic tensides with chlorine dioxide as disinfection agent in such chain lubricants.

Surprisingly, it was ascertained that chlorine dioxide in the necessary low concentrations clearly increases the partly known lubricant action of the tensides contained so that their concentration can be lowered, which represents a further relief of the environment.

It is known that chlorine dioxide is suitable for the bleaching in the textile, cellulose and paper industry, as well as also for water disinfection, disinfection and deodorising of evil-smelling wastes and waste water, as well as for the bleaching of oils, fats and waxes (cf. RÖMPPS Chemie-Lexikon, 9th edition, p. 711). Corresponding aqueous solutions are, therefore, produced and used on a large scale. However, these are not stable and have an unpleasant pungent smell from the chlorine dioxide gassing off which acts irritatingly on the respiratory canal and, therefore, is usually only handled in closed vessels.

Surprisingly, it has now been found that the concentration of chlorine dioxide in the chain lubricant necessary for an antimicrobial action is so small that a noticeable gassing off does not take place. On the other band, it appears to be surprising that the low concentrations of chlorine dioxide are not reduced and thus inactivated by the other component materials of the chain lubricants which, in comparison thereto, are present in considerable excess, especially by the tensides used. An influencing of the clarification plant can be excluded since these small amounts of chlorine dioxide are so rapidly reduced by other easily oxidisable materials occurring in the waste water that the aerobic and anaerobic biological steps of the clarification plant are not disturbed. Since, due to this reduction, practically only chloride ions still remain, this type of disinfection, in contradistinction to the biocides and biocidally-acting tensides used according to the prior art, do not influence the environment.

For a sufficient disinfection of transport chains, it suffices when the chain lubricants contain chlorine dioxide in very small concentration. A concentration of 0.5–5 mg/l, especially of about 1–3 mg/l, has proved to be especially useful. First above 5 mg/l is a weak smell of chlorine dioxide noticeable which, above 10 mg/l, becomes unpleasantly clear. A completely sufficient disinfection of the transport chains is ensured when the transport chain is, in the case of each cycle, again contacted with the chain lubricant which, in the case of usual transport speeds (0.5–3)m/sec in the case of 40 m length) takes place in about every 0.5 to 3 min. For this purpose, the chain can either run through an appropriate bath of chain lubricant or is preferably sprayed with the chain lubricant, whereby a thin film of the chain lubricant fixes on the chain.

The aqueous chain lubricant contains tensides and adjuvants in amounts of 0.2–1.5 g/l, preferably of 0.3–1.0 g/l, as aqueous solution by means of which the necessary lubricating action is achieved. As tensides, there are especially preferred monoalkyl-polyalkylene glycol ether carboxylic acids of the following general formula (I):

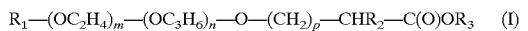

$$R_1-(OC_2H_4)_m-(OC_3H_6)_n-O-(CH_2)_p-CHR_2-C(O)OR_3 \quad (I)$$

wherein $R_1$ signifies a saturated linear or branched $C_1$–$C_{22}$ alkyl radical, a mono- or polyunsaturated linear or branched alkenyl or alkynyl radical with 2 to 22 carbon atoms or an aryl radical possibly substituted one or more times by $C_1$–$C_{22}$-alkyl or alkenyl or alkynyl groups, m a number in the range of 0 to 30, n a number in the range of 0 to 30, p a number in the range of 1 to 4, $R_2$ a hydroxyl group or a hydrogen and $R_3$ hydrogen, a methyl group or an alkali metal.

Furthermore, as tensides, there are especially preferred alkylbenzene-sulphonic acids and their salts of the following general formula (II):

$$R_4-C_6H_6-SO_3M \quad (II)$$

wherein $R_4$ signifies a saturated linear or branched $C_1$–$C_{22}$-alkyl radical or a mono- or polyunsaturated linear or branched alkenyl or alkynyl radical with 2 to 22 carbon atoms and M is hydrogen or an alkali metal.

Further especially preferred are monoalkyl-poly-alkylene glycol phosphoric acid mono- or diesters of the following general formula (III);

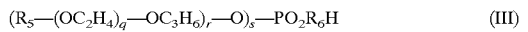

$$(R_5-(OC_2H_4)_q-OC_3H_6)_r-O)_s-PO_2R_6H \quad (III)$$

wherein $R_5$ signifies a saturated linear or branched $C_1$–$C_{22}$-alkyl radical, a mono- or polyunsaturated alkenyl or alkynyl radical with 2 to 22 carbon atoms or an aryl radical possibly mono- or poly-substituted by $C_1$–$C_{22}$-alkyl or alkenyl or alkynyl groups, q is a number in the range of 0 to 30, r a number in the range of 0 to 30, s 1 or 2, $R_6$ is a hydroxyl group insofar as s is 1 and $R_6$ is omitted insofar as s is 2.

Furthermore, other anionic and nonionic tensides can be added to the mixture. Fatty amines, other cationic tensides and amphoteric tensides are expressly not component of the invention since, in usually used concentration, they can exert a damaging influence on clarification plant.

As adjuvants, there are especially usual polyethylene glycols via which the viscosity of the solution and the tolerance against hard water can be improved. Amounts of 0.5–5 g/l are thereby usable. As solubiliser, there can, furthermore, be used alcohols or ethers, such as isopropanol, butyl glycol, dibutyl glycol or ethylene glycol ether. Furthermore, to the mixture can be added acids or bases for the regulation of the pH value which is preferably to lie in a range of 5 to 8.

For economic reasons, it is useful to produce the chain lubricant as concentrate and first to dilute to the above concentration for use, whereby, at the same time, the disinfecting chlorine dioxide is added as aqueous solution. The concentrates usually have concentrations of about 2–30 wt. % of component materials and 98–70 wt. % of water so that the desired end concentration can be adjusted by addition of the 100 to 1000 fold amount of water.

The concentration of the chain lubricant in the solutions used must be so adjusted that they clearly reduce the frictional resistance between conveyed goods and transport chain. The frictional resistance is defined by the so-called frictional value. Solutions of use of chain lubricants must display a frictional value in the range of 0.1–0.2, preferably 0.11–0.15. The frictional value is determined in that one places flasks on a transport band which is continuously sprayed with the lubricant solution and moved with constant speed. One measures the pressure which the flasks exert in the direction of transportation on a firmly standing obstacle. The frictional value is then given as quotient from the measured pressure and the weight of the flask in g.

For pure water as control, there are given frictional values of 0.45 to 0.5, for water mixed with 0.1–3.0% commercially available chain lubricant frictional values of 0.1 to 0.25.

Experiments with differing tensides and differing amounts of chlorine dioxide are given in the following table. The differing tensides were thereby dissolved in amounts of 1–4 g/10 l of water and 0.55 mg/l, 1.36 mg/l, 5.45 mg/l or 8.17 mg/l chlorine dioxide added thereto. The pH value of the solution lay at about 7.5+/−0.5. For comparison, a few commercially available products are also given which are used in each case in the concentrations of 3 or 5 g/l usually used. The following abbreviations of the raw materials are used:

T1: $C_{16}$–$C_{18}$-ether carboxylic acid with one ethylene oxide group

T2: $C_{16}$–$C_{18}$-ether carboxylic acid with 2 ethylene oxide groups

T3: $C_{16}$–$C_{18}$ether carboxylic acid with on average 5 ethylene oxide groups T4: linear alkyl($C_{10-13}$)-benzene-sulphonic acid T5: alkyl($C_{12-18}$)-ethoxy(6–20 EO)-propoxy (less than 8 PO)-phospboric acid mono- and diesters $H_1$: commercial product based on amphotensides $H_2$: commercial product based on amino and acetic acid $H_3$: commercial product based on fatty amino and acetic acid $H_4$: commercial product based on amino and lactic acid $H_5$: commercial product based on alkali metal fatty acid salts (soaps).

TABLE 1

| | | | ClO$_2$ mg/l | | |
|---|---|---|---|---|---|
| | | 0.0 mg/l | 0.55 mg/l | 1.36 mg/l | 5.45 mg/l | 8.17 mg/l |
| | smell | none | none | none | weak | distinct |
| raw material | g/10 1 batch | | | frictional value (fv) | | |
| T1 | 1 | 0.236 | | 0.192 | 0.333 | 0.365 |
| T1 | 2 | 0.164 | | 0.162 | 0.236 | 0.233 |
| T1 | 4 | 0.197 | 0.165 | 0.134 | 0.136 | 0.140 |
| T2 | 4 | 0.194 | | | 0.174 | |
| T3 | 4 | 0.271 | | | 0.135 | |
| T4 | 4 | 0.297 | | | 0.194 | |
| T5 | 4 | 0.194 | | | 0.20 | |
| mixtures of tensides | | | | | | |
| T1/T4 | 2/2 | 0.151 | 0.133 | | 0.129 | |
| T2/T4 | 2/2 | 0.252 | | | 0.165 | |
| T3/T4 | 2/2 | 0.234 | | | 0.196 | |
| T1/T5 | 2/2 | 0.123 | 0.128 | | 0.122 | |
| T2/T5 | 2/2 | 0.143 | | | 0.122 | |
| T3/T5 | 2/2 | 0.211 | | | 0.183 | |
| commercially available chain lubricants | | | | | | |
| H$_1$ | 30 | 0.280 | | | 0.365 | |
| H$_2$ | 30 | 0.138 | 0.136 | | 0.140 | |
| H$_3$ | 30 | 0.142 | | | 0.149 | |
| H$_4$ | 30 | 0.135 | | | 0.450 | |
| H$_5$ | 50 | 0.281 | | | 0.397 | |

In a further experiment, the germ-killing action was investigated on the basis of micro-organisms frequently occurring in the range of filling plant. For this purpose, a solution of 4 g ether carboxylic acid T1 was mixed with 0.1–0.5 mg ClO$_2$/l and in each case 90 ml of a so prepared solution mixed with 10 ml of bacteria solution which had a concentration of about 10,000 cells/ml so that in all there was given a concentration of 1000 cells/ml which corresponds to usual concentrations in the rinsing water. At the times given in the Tables, samples were withdrawn and the decrease of the cell count investigated by means of dilution series and living titre plating out (revolving table, Drigalsky spatula). The following Tables show that bacteria already at concentrations of 0.3 mg/ml are killed off with certainty within 5 min. Yeast cells at this concentration are clearly damaged and at 0.5 mg/l are also completely killed off.

TABLE 2

Concentration 0.1 mg ClO$_2$/l

| | contact time | | | | |
|---|---|---|---|---|---|
| Organism | 0 min | 5 min | 10 min | 20 min | 30 min |
| E. coli | 2050.00 | 1450.00 | 1030.00 | 1040.00 | 1010.00 |
| yeast | 900.00 | 910.00 | 870.00 | 910.00 | 890.00 |
| Pectinatus | 1020.00 | — | — | — | — |
| lactic acid bacteria | 1230.00 | 420.00 | 150.00 | 110.00 | 110.00 |
| Pediococci | 1020.00 | 100.00 | 12.00 | — | — |

TABLE 3

Concentration 0.15 mg ClO$_2$/l

| | contact time | | | | |
|---|---|---|---|---|---|
| organism | 0 min | 5 min | 10 min | 20 min | 30 min |
| E. coli | 1000.00 | — | — | — | — |
| yeast | 1050.00 | 100.00 | — | — | — |
| Pectinatus | 1820.00 | — | — | — | — |
| lactic acid bacteria | 1710.00 | — | — | — | — |
| Pediococci | 570.00 | 400.00 | 60.00 | | |

TABLE 4

Concentration 0.3 mg ClO$_2$/l

| | contact time | | | | |
|---|---|---|---|---|---|
| organism | 0 min | 5 min | 10 min | 20 min | 30 min |
| E. coli | 1150.00 | — | — | — | — |
| yeast | 950.00 | 90.00 | — | — | — |
| Pectinatus | 920.00 | — | — | — | — |
| lactic acid bacteria | 1200.00 | — | — | — | — |
| Pediococci | 900.00 | — | — | — | — |

TABLE 5

Concentration 0.5 mg ClO$_2$/l

| | contact time | | | | |
|---|---|---|---|---|---|
| organism | 0 min | 5 min | 10 min | 20 min | 30 min |
| E. coli | 1050.00 | — | — | — | — |
| yeast | 900.00 | — | — | — | — |
| Pectinatus | 960.00 | — | — | — | — |
| lactic acid bacteria | 1200.00 | — | — | — | — |
| Pediococci | 1000.00 | — | — | — | — |

Especially in the presence of organic substance, chlorine dioxide decomposes to ineffective compounds, such as chlorides.

Therefore, in the preliminary experiment, the breakdown speed of chlorine dioxide in the open stirred system was determined in order to simulate as far as possible the conditions of a transport chain. For this purpose, in a 2 litre glass beaker was again prepared a solution of 4 g/10 l T1 and mixed with 5, 3 or 1 mg/l chlorine dioxide. In each case, 100 ml of this solution were filled into the glass beaker and stirred for 4 hours with a rapidly running winged stirrer. The chlorine dioxide content is measured with a selective electrode. The measurement results are given in the following Table.

TABLE 6

Breakdown speed of chlorine dioxide

| starting concentration ClO$_2$ mg/l | time (minutes) | | | | |
|---|---|---|---|---|---|
| | 30 | 60 | 120 | 180 | 240 |
| 5 | 3.8 | 3.5 | 3.1 | 2.8 | 2.4 |
| 3 | 2.5 | 2.1 | 1.5 | 1 | 0.5 |
| 1 | 0.8 | 0.6 | 0.5 | 0.3 | 0.2 |

Also even after four hours, there is given a decrease of the concentration to still effective concentrations.

What is claimed is:

1. Chain lubricant for conveyor and transport systems comprising water, a tenside selected from the group consisting of a) a tenside comprising a monoalkyl-polyalkyleneglycol ether carboxylic acid of the following formula (I)

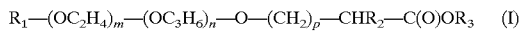

$$R_1—(OC_2H_4)_m—(OC_3H_6)_n—O—(CH_2)_p—CHR_2—C(O)OR_3 \quad (I)$$

wherein $R_1$ signifies a saturated linear or branched $C_1$–$C_{22}$-alkyl radical, a mono- or polyunsaturated linear or branched alkenyl or alkynyl radical with 2 to 22 carbon atoms or an aryl radical optionally substituted one or more times by $C_1$–$C_{22}$-alkyl or alkenyl or alkynyl groups, m is a number in the range of 0 to 30,
n is a number in the range of 0 to 30,
p is a number in the range of 1 to 4,
$R_2$ is a hydroxyl group or a hydrogen and
$R_3$ is hydrogen, a methyl group or an alkali metal;

b) a tenside comprising an alkyl-benzenesulphonic acid or one of its salts of the following general formula (II)

$$R_4—C_6H_6—SO_3M \quad (II)$$

wherein R4 is a saturated linear or branched $C_1$–$C_{22}$-alkyl radical or a mono- or poly-unsaturated linear or branched alkenyl or alkynyl radical with 2 to 22 carbon atoms and M is hydrogen or an alkali metal;

c) a tenside comprising a monoalkyl-polyalkyleneglycol phosphoric acid mono or diester of the general formula (III)

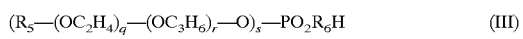

$$(R_5—(OC_2H_4)_q—(OC_3H_6)_r—O)_s—PO_2R_6H \quad (III)$$

wherein $R_5$ signifies a saturated linear or branched $C_1$–$C_{22}$-alkyl radical, a mono- or polyunsaturated linear or branched alkenyl or alkynyl radical with 2 to 22 carbon atoms or an aryl radical optionally substituted one or more times by $C_1$–$C_{22}$-alkyl or alkenyl or alkynyl groups, q is a number in the range of 0 to 30,
r is a number in the range of 0 to 30,
s is 1 or 2,
$R_6$ is hydroxyl if s is 1 and, if s is 2, $R_6$ is not present; and d) mixtures thereof;

and disinfection agents, as well as adjuvant and additive materials, wherein said disinfection agent comprises chlorine dioxide.

2. A chain lubricant according to claim 1, wherein said chain lubricant comprises anionic and nonionic tensides, additives and adjuvants.

3. A chain lubricant according to claim 1, wherein said chain lubricant comprises the chlorine dioxide in a concentration of 0.5–5 mg/l and the tensides in a concentration of 0.1–1 g/l.

4. Process for the lubrication of chains of conveyor and transport bands, comprising mixing together a chain lubricant according to claim 1, said chain lubricant comprising a concentrate of the tensides, additive and adjuvant materials and a solution of chlorine dioxide and an amount of water sufficient to obtain a desired concentration and applying the resulting mixture to a transport chain continuously or at intervals.

5. A process according to claim 4, comprising contacting each position of said transport chain, during circulation, with fresh chain lubricant at time intervals of 0.5–3 minutes.

6. A chain lubricant for conveyor and transport systems comprising water, a tenside selected from the group consisting of a) a tenside comprising a monoalkyl-polyalkyleneglycol ether carboxylic acid of the following formula (I)

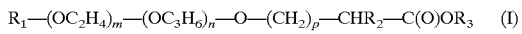

$$R_1—(OC_2H_4)_m—(OC_3H_6)_n—O—(CH_2)_p—CHR_2—C(O)OR_3 \quad (I)$$

wherein $R_1$ signifies a saturated linear or branched $C_1$–$C_{22}$-alkyl radical, a mono- or polyunsaturated linear or branched alkenyl or alkynyl radical with 2 to 22 carbon atoms or an aryl radical optionally substituted one or more times by $C_1$–$C_{22}$-alkyl or alkenyl or alkynyl groups, m is a number in the range of 0 to 30,
n is a number in the range of 0 to 30,
p is a number in the range of 1 to 4,
$R_2$ is a hydroxyl group or a hydrogen and
$R_3$ is hydrogen, a methyl group or an alkali metal;

b) a tenside comprising an alkyl-benzenesulphonic acid or one of its salts of the following general formula (II)

$$R_4—C_6H_6—SO_3M \quad (II)$$

wherein R4 is a saturated linear or branched $C_1$–$C_{22}$-alkyl radical or a mono- or poly-unsaturated linear or branched alkenyl or alkynyl radical with 2 to 22 carbon atoms and M is hydrogen or an alkali metal;

c) a tenside comprising a monoalkyl-polyalkyleneglycol phosphoric acid mono or diester of the general formula (III)

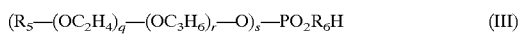

$$(R_5—(OC_2H_4)_q—(OC_3H_6)_r—O)_s—PO_2R_6H \quad (III)$$

wherein $R_5$ signifies a saturated linear or branched $C_1$–$C_{22}$-alkyl radical, a mono- or polyunsaturated linear or branched alkenyl or alkynyl radical with 2 to 22 carbon atoms or an aryl radical optionally substituted one or more times by $C_1$–$C_{22}$-alkyl or alkenyl or alkynyl groups, q is a number in the range of 0 to 30,
r is a number in the range of 0 to 30,
s is 1 or 2,
$R_6$ is hydroxyl if s is 1 and, if s is 2, $R_6$ is not present; and d) mixtures thereof;

and disinfection agents, as well as adjuvant and additive materials, said disinfection agent comprises chlorine dioxide and wherein said lubricant is free of cationic tensides and fatty amine compounds.

7. A chain lubricant for conveyor and transport systems comprising water, a tenside selected from the group consisting of a) a tenside comprising a monoalkyl-polyalkyleneglycol ether carboxylic acid of the following formula (I)

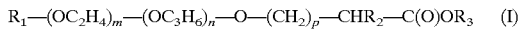

$$R_1—(OC_2H_4)_m—(OC_3H_6)_n—O—(CH_2)_p—CHR_2—C(O)OR_3 \quad (I)$$

wherein $R_1$ signifies a saturated linear or branched $C_1$–$C_{22}$-alkyl radical, a mono- or polyunsaturated linear or branched alkenyl or alkynyl radical with 2 to 22 carbon atoms or an aryl radical optionally substituted one or more times by $C_1$ —$C_{22}$-alkyl or alkenyl or alkynyl groups, m is a number in the range of 0 to 30,
n is a number in the range of 0 to 30,
p is a number in the range of 1 to 4,
$R_2$ is a hydroxyl group or a hydrogen and $R_3$ is hydrogen, a methyl group or an alkali metal;

b) a tenside comprising an alkyl-benzenesulphonic acid or one of its salts of the following general formula (II)

$$R_4\text{—}C_6H_6\text{—}SO_3M \tag{II}$$

wherein R4 is a saturated linear or branched $C_1$–$C_{22}$-alkyl radical or a mono- or poly-unsaturated linear or branched alkenyl or alkynyl radical with 2 to 22 carbon atoms and M is hydrogen or an alkali metal;

c) a tenside comprising a monoalkyl-polyalkyleneglycol phosphoric acid mono or diester of the general formula (III)

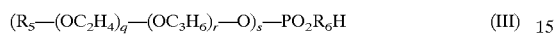
$$(R_5\text{—}(OC_2H_4)_q\text{—}(OC_3H_6)_r\text{—}O)_s\text{—}PO_2R_6H \tag{III}$$

wherein $R_5$ signifies a saturated linear or branched $C_1$–$C_{22}$-alkyl radical, a mono- or polyunsaturated linear or branched alkenyl or alkynyl radical with 2 to 22 carbon atoms or an aryl radical optionally substituted one or more times by $C_1$–$C_{22}$-alkyl or alkenyl or alkynyl groups, q is a number in the range of 0 to 30, r is a number in the range of 0 to 30, s is 1 or 2, $R_6$ is hydroxyl if s is 1 and, if s is 2, $R_6$ is not present; and d) mixtures thereof;

and disinfection agents, as well as adjuvant and additive materials, wherein said disinfection agent comprises chlorine dioxide in a concentration of 0.5 to 5 mg/l.

* * * * *